United States Patent
Kato

(10) Patent No.: US 8,937,123 B2
(45) Date of Patent: Jan. 20, 2015

(54) ADDITION CURABLE SELF-ADHESIVE SILICONE RUBBER COMPOSITION

(71) Applicant: Shin-Etsu Chemical Co., Ltd., Tokyo (JP)

(72) Inventor: Nobu Kato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/099,321

(22) Filed: Dec. 6, 2013

(65) Prior Publication Data

US 2014/0179863 A1 Jun. 26, 2014

(30) Foreign Application Priority Data

Dec. 21, 2012 (JP) ................ 2012-278862

(51) Int. Cl.
*C08K 5/34* (2006.01)
*C09J 183/06* (2006.01)
*C09J 183/04* (2006.01)
*C08L 83/04* (2006.01)
*C08G 77/52* (2006.01)
*C08G 77/12* (2006.01)
*C08G 77/20* (2006.01)

(52) U.S. Cl.
CPC .............. *C09J 183/06* (2013.01); *C09J 183/04* (2013.01); *C08L 83/04* (2013.01); *C08G 77/52* (2013.01); *C08G 77/12* (2013.01); *C08G 77/20* (2013.01)
USPC ...................................... 524/106

(58) Field of Classification Search
USPC ...................................... 524/106
See application file for complete search history.

(56) References Cited

U.S. PATENT DOCUMENTS

| 3,192,181 | A | 6/1965 | Moore |
| 4,686,124 | A | 8/1987 | Onohara et al. |
| 5,405,896 | A | 4/1995 | Fujiki et al. |
| 5,879,809 | A | 3/1999 | Muramatsu et al. |
| 5,989,704 | A | 11/1999 | Hashimoto et al. |
| 6,743,515 | B1 | 6/2004 | Müller et al. |
| 7,592,070 | B2 * | 9/2009 | Takanami et al. ............. 428/448 |
| 8,158,738 | B2 * | 4/2012 | Kato et al. ....................... 528/15 |
| 2009/0068475 | A1 | 3/2009 | Bosshammer |

FOREIGN PATENT DOCUMENTS

| EP | 0 276 790 A2 | 8/1988 | |
| EP | 2 305 765 A1 | 4/2011 | |
| GB | EP2305765 | * 6/2011 | ............ C09J 183/04 |
| JP | 63-183843 A | 7/1988 | |
| JP | 02-34311 B2 | 8/1990 | |
| JP | 06-172738 A | 6/1994 | |
| JP | 09-165516 A | 6/1997 | |
| JP | 09-165517 A | 6/1997 | |
| JP | 2001-200162 A | 7/2001 | |
| JP | 2008-537967 A | 10/2008 | |

OTHER PUBLICATIONS

Extended European Search Report issued Mar. 12, 2014, in European Patent Application No. 13197317.4.

* cited by examiner

*Primary Examiner* — Ling Choi
*Assistant Examiner* — Thuy-Ai Nguyen
(74) *Attorney, Agent, or Firm* — Birch, Stewart, Kolasch & Birch, LLP

(57) ABSTRACT

An addition curable self-adhesive silicone rubber composition is provided. This silicone rubber composition comprises (A) 100 parts by weight of an organopolysiloxane containing at least 2 alkenyl groups bonded to silicon atoms per molecule, (B) 0.05 to 10 parts by weight of an organosilicon compound containing 1 to 100 silicon atoms which has at least 1 phenylene skeleton per molecule, and which has at least 1 hydrogen atom bonded to a silicon atom, (C) 0 to 30 parts by weight of an organohydrogenpolysiloxane containing at least 2 hydrogen atoms bonded to silicon atoms per molecule, and containing no phenylene skeleton in the molecule, (D) 0.001 to 0.1 part by weight of a triazole compound, and (E) a catalytic amount of a platinum catalyst. This silicone rubber composition is capable of forming a cured article having good adhesion to various organic resins.

6 Claims, No Drawings

ADDITION CURABLE SELF-ADHESIVE SILICONE RUBBER COMPOSITION

CROSS-REFERENCE TO RELATED APPLICATION

This non-provisional application claims priority under 35 U.S.C. §119(a) on Patent Application No. 2012-278862 filed in Japan on Dec. 21, 2012, the entire contents of which are hereby incorporated by reference.

TECHNICAL FIELD

This invention relates to an addition curable silicone rubber composition having self-adhesiveness. More specifically, this invention relates to an addition curable silicone rubber composition having self-adhesiveness which is capable of adhering to organic resins such as polyamide, polybuthylene terephthalate (PBT), polycarbonate, polyphenylene oxide, and polyphenylene sulfide.

BACKGROUND ART

Silicone rubbers have been widely used in all fields including automobile components such as connector seal and spark plug boots, electric and electronic parts such as rolls in a copying machine and packing in a microwave oven; building materials such as sealant, as well as other products such as feeding bottle nipple and diving gears, in view of the high heat resistance, cold resistance, safety, electric insulation, weatherability, and the like. In these applications, the silicone rubbers are often used in combination with a metal, and also, with an organic resin, and many methods have been proposed to obtain articles wherein an addition curable silicone rubber composition has been integrally cured with a metal or an organic resin. Examples of such typical methods include a method wherein a primer is coated on the surface of the molded resin and an uncured rubber composition is coated over the primer and cured for adhesion; a method wherein an adhesive is coated on the interface for integration of the underlying material and the overlying material; a method wherein two materials are integrated by fitting with each other by double molding; and a method wherein a self-adhesive silicone rubber composition is coated over a molded resin material and cured. However, the methods involving the use of an adhesive or a primer suffered from the problems of increase in the production stages, and also from the problems of contaminating other areas of the surface depending on the method used for the coating. The method using the double molding had constraint in the shape of the integrated article and shortage in the adhesion at the interface. Accordingly, self-adhesive silicone rubber compositions comprising a silicone rubber composition having an adhesive preliminarily added are used, and the use of the self-adhesive silicone rubber composition has become an effective means for producing an article integrally molded with a resin since the coating step as described above is no longer necessary which enabled shorter working time, reduced cost, and improved workability.

Many methods have been proposed for the adhesion of an addition heat curable silicone rubber composition with an organic resin in primer-less molding. An exemplary method is coating of a self-adhesive silicone rubber composition on the resin followed by curing, and various technologies have been proposed for the self-adhesive silicone rubber composition by identifying the adhesive component. Also proposed are a method wherein an organohydrogenpolysiloxane containing at least 30% by mole of hydrogen atoms directly bonded to silicon atoms is added to the organic resin, and this resin is used for the adhesion with an addition-curable silicone rubber composition (Patent Document 1: JP-B H02-34311); a method wherein a silicone rubber composition is adhered to an olefin resin prepared by grafting a compound having an aliphatic unsaturated group and a hydrolyzable group bonded to a silicon atom for the production of an integrated article (Patent Document 2: JP-A S63-183843); and a method wherein a thermoplastic resin having added a compound having an aliphatic unsaturated group and hydrogen atoms bonded to silicon atoms and a silicone rubber composition are adhered for the production of an integrated article, and a method wherein an integral molded article of a resin prepared by blending an oligomer containing an aliphatic unsaturated group to a thermoplastic resin with an oil-bleedable silicone rubber (Patent Document 3: JP-A H09-165516 and Patent Document 4: JP-A H09-165517).

However, in the addition heat curable silicone rubber composition, sufficient adhesion was not obtained by the short time molding when used for the adhesion with general purpose thermoplastic resins such as ABS, PC, PE, PP, PBT, PET, acryl, PA, aromatic PA, PPO, PPS, and urethane, and the resin modification as indicated by the proposals as described above was necessary for a sufficient molding. Such resin modification requires additional step, and hence, increase in the cost, and the resin modification may involve change in the resin properties.

Self-adhesive and addition crosslinkable silicone rubber compositions have been proposed for responding to these problems (Patent Document 5: JP-A H06-172738, Patent Document 6: JP-A 2001-200162, and Patent Document 7: JP-A 2008-537967), and these literatures disclose that the addition of an organohydrogenpolysiloxane having SiH bond and an aromatic skeleton in one molecule in the silicone rubber composition as an adhesion improver material enables adhesion of the silicone rubber composition to an organic resin or a metal even by the short time molding.

However, when the organic resin has a low softening point, the resin deformed under the condition of the curing temperature of typical silicone rubber, namely, at 120 to 220° C., and molding of the resin as designed was sometimes difficult.

In such a case, the molding temperature should be reduced. However, the reduced molding temperature results in the markedly reduced curing speed of the silicone rubber, and hence, longer molding time. When the amount of the curing catalyst is increased to reduce the time required for the molding, pot life and workability are sacrificed.

SUMMARY OF INVENTION

Technical Problem

The present invention has been completed in view of the situation as described above, and an object of the present invention is to provide an addition curable self-adhesive silicone rubber composition which can be molded at a relatively low temperature in a short time and which has sufficient pot life for working without sacrificing its rapid curability at low temperature, when used in producing an integrally molded article of a silicone rubber composition and a thermoplastic resin used for automobile components, telecommunications equipment, and various other electric and electronic products.

Solution to Problem

The inventors of the present invention made an intensive study to realize the object as described above, and found that, by blending an effective amount of (D) a triazole compound with a silicone rubber composition comprising (A) an organopolysiloxane containing at least 2 alkenyl groups bonded to the silicon atoms per molecule, (B) an organosilicon compound containing 1 to 100 silicon atoms which has at least 1 phenylene skeleton per molecule, and which has at least 1 hydrogen atom bonded to silicon atom per molecule, (C) an organohydrogenpolysiloxane containing at least 2 hydrogen atoms bonded to silicon atoms per molecule, and containing no phenylene skeleton in the molecule, (D) a triazole compound, (E) a platinum catalyst, (F) a reinforcement silica fine powder, and (G) an acetylene alcohol compound or an acetylene alcohol compound having its alcoholic hydroxy group modified with a silane or a siloxane, there can be obtained a composition wherein the 10% curing time T10 (at 110° C. for 3 minutes) is 10 seconds≤T10≤60 seconds, and when shear viscosity 0.9 s$^{-1}$ at 25° C. after storing at 25° C. for 10 minutes after mixing the components (A) to (E) is $\eta_0$, and shear viscosity 0.9 s$^{-1}$ at 25° C. after storing at 25° C. for 12 hours after mixing the components (A) to (E) is $\eta_{12}$, $\eta_{12}/\eta_0 \leq 2$.

The inventors also found that this composition can be molded at a relatively low temperature in a short time; that this composition has sufficient pot life for working; and that this composition is suitable for adhesion with a wide variety of resins such as polycarbonate, PBT (polybuthylene terephthalate), PET (polyethylene terephthalate), polyamide, PPS (polyphenylene sulfide), PPO (polyphenylene oxide), polyimide, and polyurethane. The present invention has been completed on the bases of such finding.

Accordingly, the present invention provides an addition curable self-adhesive silicone rubber composition comprising (A) 100 parts by weight of an organopolysiloxane containing at least 2 alkenyl groups bonded to silicon atoms per molecule, (B) 0.05 to 10 parts by weight of an organosilicon compound containing 1 to 100 silicon atoms which has at least 1 phenylene skeleton per molecule, and which has at least 1 hydrogen atom bonded to silicon atom per molecule, (C) 0 to 30 parts by weight of an organohydrogenpolysiloxane containing at least 2 hydrogen atoms bonded to silicon atoms per molecule, and containing no phenylene skeleton in the molecule, (D) 0.001 to 0.1 part by weight of a triazole compound, and (E) a catalytic amount of a platinum catalyst.

The addition curable self-adhesive silicone rubber composition may further comprises (F) a reinforcement silica fine powder at an amount of 5 to 100 parts by weight in relation to 100 parts by weight of the component (A).

The addition curable self-adhesive silicone rubber composition may also comprises (G) an acetylene alcohol compound or an acetylene alcohol compound having its alcoholic hydroxy group modified with a silane or a siloxane at an amount of 0.001 to 1 part by weight in relation to 100 parts by weight of the component (A).

In the addition curable self-adhesive silicone rubber composition, the content of the component (C) is preferably 0.1 to 30 parts by weight in relation to 100 parts by weight of the component (A).

The molar ratio of total amount of the SiH functional group in the component (B) and the component (C) to the amount of the alkenyl group in the component (A) (SiH/alkenyl) is preferably 0.8 to 5.0.

The addition curable self-adhesive silicone rubber composition preferably has the following property: the 10% curing time T10 (at 110° C. for 3 minutes) is 10 seconds≤T10≤60 seconds, and $\eta_{12}/\eta_0 \leq 2$ when shear viscosity 0.9 s$^{-1}$ at 25° C. after storing at 25° C. for 10 minutes after mixing the components (A) to (E) is $\eta_0$, and shear viscosity 0.9 s$^{-1}$ at 25° C. after storing at 25° C. for 12 hours after mixing the components (A) to (E) is $\eta_{12}$.

The addition curable self-adhesive silicone rubber composition is preferably used for adhesion to a thermoplastic resin selected from acrylonitrile-butadiene-styrene (ABS) resin, polycarbonate (PC) resin, polyurethane (PU) resin, styrene resin, polyethylene (PE) resin, polypropylene (PP) resin, acrylic resin, polyethylene terephthalate (PET) resin, polybuthylene terephthalate (PBT) resin, polyphenylene oxide (PPO) resin, polyphenylene sulfide (PPS) resin, polysulfone resin, nylon (PA) resin, aromatic polyamide (aromatic PA) resin, polyimide (PI) resin, and liquid crystal resin.

Advantageous Effects of Invention

The addition curable self-adhesive silicone rubber composition of the present invention is capable of forming cured product exhibiting excellent adhesion to various organic resin.

DESCRIPTION OF EMBODIMENTS

Next, the present invention is described in detail.

First, the organopolysiloxane containing at least 2 alkenyl groups bonded to silicon atoms per molecule (the component (A)) is the main component (base polymer) of the composition of the present invention, and the component (A) used is preferably the one having the following average compositional formula (I):

$$R^1_a SiO_{(4-a)/2} \qquad (I)$$

wherein $R^1$ is independently an unsubstituted, a halogen atom-substituted, or a cyano group-substituted monovalent hydrocarbon group containing 1 to 10 carbon atoms, and preferably 1 to 8 carbon atoms, and a is a positive number in the range of 1.5 to 2.8, preferably 1.8 to 2.5, and more preferably 1.95 to 2.05.

Examples of the substituted or unsubstituted monovalent hydrocarbon group containing 1 to 10 carbon atoms represented by $R^1$ include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as phenyl group, tolyl group, xylyl group, and naphthyl group; aralkyl groups such as benzyl group, phenylethyl group, and phenylpropyl group; alkenyl groups such as vinyl group, allyl group, propenyl group, isopropenyl group, butenyl group, hexenyl group, cyclohexenyl group, and octenyl group; any of the foregoing groups having a part or all of hydrogen atoms substituted with a halogen atom such as fluorine, bromine, or chlorine, cyano group, or the like for example, chloromethyl group, chloropropyl group, bromoethyl group, trifluoropropyl group, and cyanoethyl group. Preferably, at least 90% by mole of all $R^1$, and more preferably, all $R^1$ other than the alkenyl group is methyl group.

Of the $R^1$, at least 2 should be an alkenyl group preferably having 2 to 8, and more preferably 2 to 6 carbon atoms, and most preferably, vinyl group.

Content of the alkenyl group in the organopolysiloxane is preferably $1.0 \times 10^{-6}$ mol/g to $5.0 \times 10^{-3}$ mol/g, and in particular, $1.0 \times 10^{-5}$ mol/g to $2.0 \times 10^{-3}$ mol/g. The alkenyl group content of less than $1.0 \times 10^{-6}$ mol/g may result in the excessively low rubber hardness, and the rubber will be in gel form. The alkenyl group content in excess of $5.0 \times 10^{-3}$ mol/g may result in excessively high crosslinking density, and the resulting rubber may have an unduly high hardness.

The alkenyl group may be bonded to the silicon atom at the end of the molecular chain, in the midst of the molecular chain, or both.

Structure of this organopolysiloxane is basically a straight chain structure wherein the molecular chain has its opposite ends capped with a triorganosiloxy group and the backbone comprises repetition of a diorganosiloxane unit while partly branched structure, cyclic structure, and the like are also acceptable.

With regard to the molecular weight, the average degree of polymerization (weight average degree of polymerization; and so forth) is up to 1,500, typically 100 to 1,500, and preferably 150 to 1,000. Sufficient rubber texture may not be obtained at the molecular weight of less than 100 while the molecular weight in excess of 1,500 may result in the unduly high viscosity, and hence difficulty in the molding. The average degree of polymerization is typically determined in terms of polystyrene by GPC (gel permeation chromatography) analysis typically using toluene for the developing solvent.

The component (A) may also contain at least one organopolysiloxane having different molecular structure and degree of polymerization as long as the organopolysiloxane has an alkenyl group bonded to the silicon atom at opposite ends of the molecular chain.

The component (B) functions as a component contributing for the adhesion, and also, as a crosslinking agent. The component (B) is an organosilicon compound such as organosilane and organopolysiloxane having at least 1 SiH group (hydrogen atom bonded to a silicon atom) and at least 1 phenylene skeleton per molecule, and typically having 1 to 100, and preferably 2 to 30 silicon atoms per molecule. In the present invention, the term "phenylene skeleton" includes polyvalent aromatic structures such as divalent to hexavalent, and in particular, divalent to tetravalent aromatic structures such as phenylene structure, naphthalene structure, and anthracene structure.

The compound as described above is preferably an organosilicon compound such as a straight-chain or cyclic organosiloxane oligomer containing 1 to 30, preferably 2 to 20, and most preferably 4 to 10 silicon atoms or an organoalkoxysilane. The straight-chain or cyclic organosiloxane oligomer or the organoalkoxysilane further contains at least 1, typically 1 to 20, and most preferably 2 to 10 SiH groups (namely, hydrogen atom bonded to silicon atom), and also, at least 1, and typically 1 to 4 phenylene skeletons per molecule. The straight-chain or cyclic organosiloxane oligomer or the organoalkoxysilane preferably further contains at least 1 or more functional groups such as an epoxy group such as glycidoxy group, an alkoxysilyl group such as trimethoxysilyl group, triethoxysilyl group, and methyldimethoxysilyl group, an ester group, acryl group, methacryl group, anhydrous carboxy group, isocyanate group, amino group, or amide group.

Examples of such compounds include:

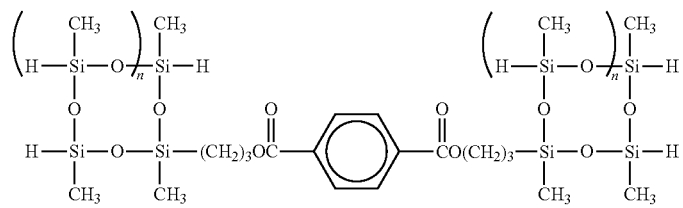

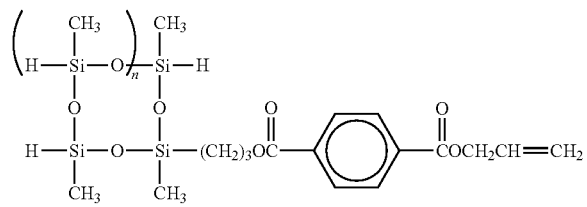

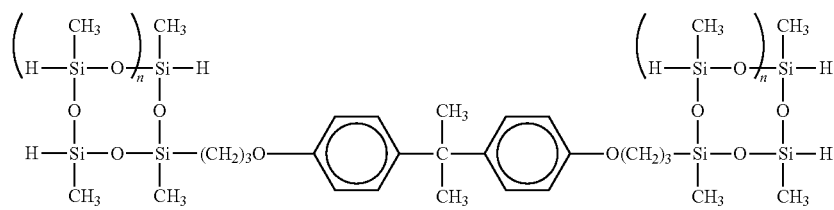

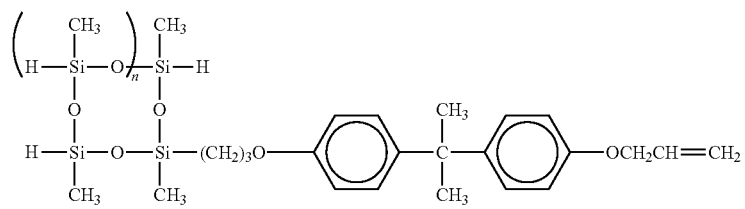

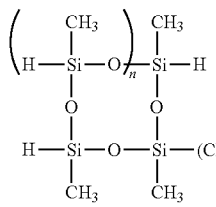 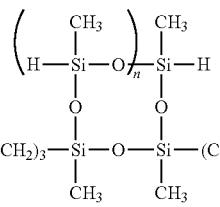

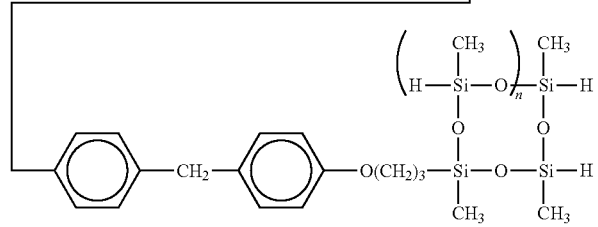

wherein n is 1 to 4, and

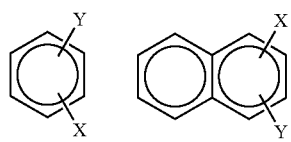 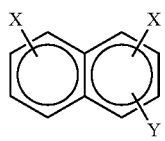 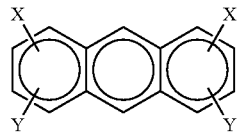

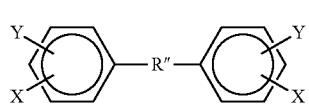 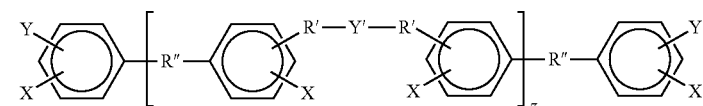

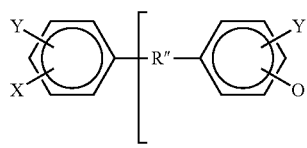 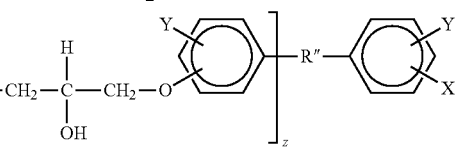

[wherein X is

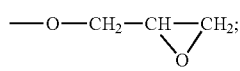

Y is either of the following groups:

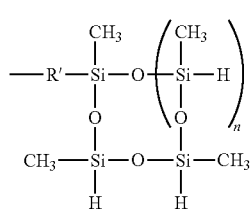

(wherein n is 1 to 4) or

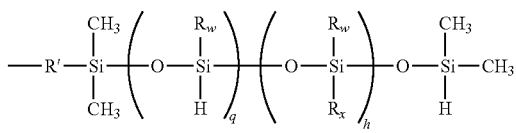

(wherein R' is a group selected from the following groups:

—O—CH₂CH₂CH₂—,   —CH₂CH₂CH₂—,

—OCH₂CH₂CH₂O—,   $-O-\underset{\underset{O}{\parallel}}{C}-CH_2CH_2CH_2-$, $-\underset{\underset{O}{\parallel}}{C}-O-CH_2CH_2CH_2-$, and  $-OCH_2\underset{\underset{CH_3}{|}}{CH}O-$ $R_w$ and $R_x$ are a substituted or unsubstituted monovalent hydrocarbon group, and q is 1 to 50 and h is 0 to 100, and preferably, q is 1 to 20 and h is 1 to 50);

R" is a group selected from the following groups:

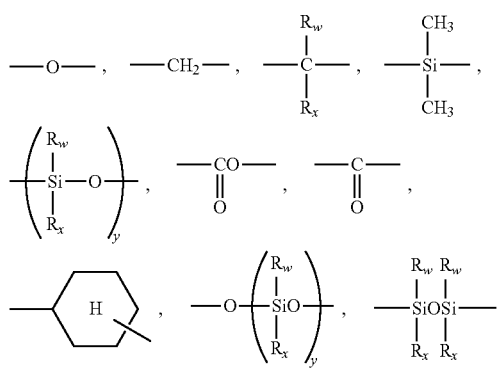

(wherein $R_w$ and $R_x$ are as defined above, and y is 0 to 100); and Y' is

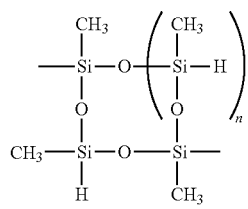

(wherein n is 1 to 4) or

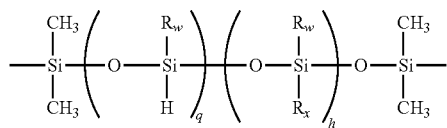

(wherein $R_w$, $R_x$, q, and h are as defined above); and
z is 1 to 10].

An organic compound or an organosilicon compound prepared by adding an alkoxysilyl group such as trimethoxysilyl group, triethoxysilyl group, or methyldimethoxysilyl group, acryl group, methacryl group, an ester group, anhydrous carboxy group, isocyanate group, amino group, amide group, or the like to the compound as described above may also be used.

The substituted or unsubstituted monovalent hydrocarbon groups $R_w$ and $R_x$ as described above are preferably those containing 1 to 12 carbon atoms, and in particular, those containing 1 to 8, and examples include alkyl groups, aryl groups, aralkyl groups, alkenyl groups, and the like which have been mentioned for $R^1$, and also, substituted monovalent hydrocarbon groups which have been substituted with an alkoxy group, acryl group, methacryl group, acryloyl group, methacryloyl group, amino group, alkylamino group, or the like.

The component (B) is incorporated at 0.05 to 10 parts by weight, preferably 0.1 to 9 parts by weight, and more preferably 0.2 to 8 parts by weight in relation to 100 parts by weight of the component (A). Sufficient adhesion is not realized when the component (B) is incorporated at an amount less than 0.05 part by weight, while incorporation in excess of 10 parts by weight may invite loss of physical properties.

The organohydrogenpolysiloxane of the component (C) is one which is not included in the component (B), and it has at least 2, and preferably at least 3 hydrogen atoms bonded to silicon atoms (namely, SiH group) per molecule while it does not have an aromatic group such as phenyl group or phenylene skeleton in the molecule. The organohydrogenpolysiloxane of the component (C) is represented by the following average compositional formula (II), and preferably, it has at least 2 (typically 2 to 200), preferably at least 3 (typically 3 to 200), more preferably 5 to 100, and still more preferably 8 to 50 hydrogen atoms bonded to the silicon atom (SiH group) pre molecule.

$$R^2_b H_c SiO_{(4-b-c)/2} \quad (II)$$

In the formula, $R^2$ is an aliphatic monovalent hydrocarbon group containing 1 to 10 carbon atoms which is unsubstituted or substituted with a halogen atom or cyano group, and b is a positive number of 0.7 to 2.1 and c is a positive number of 0.001 to 1.0 with the proviso that b+c is 0.8 to 3.0.

With regard to the formula (II), examples of the substituted or unsubstituted aliphatic monovalent hydrocarbon group containing 1 to 10 carbon atoms of $R^2$ are the same as those mentioned above for the $R^1$ of the average compositional formula (I) of the component (A) excluding the aromatic groups such as aryl group and aralkyl group such as phenyl group, and also, excluding the aliphatic unsaturated bonds such as alkenyl groups (an aliphatic saturated hydrocarbon). Typical examples are alkyl groups, and in particular, methyl group.

b is a positive number of 0.7 to 2.1, and preferably 0.8 to 2.0, and c is a positive number of 0.001 to 1.0, and preferably 0.01 to 1.0, with the proviso that b+c is 0.8 to 3.0, and preferably 1.0 to 2.5.

Molecular structure of the organohydrogenpolysiloxane of the component (C) may be any of straight chain, cyclic, branched, and tertiary network structure. In this case, the number of silicon atom per molecule (or degree of polymerization) is typically 2 to 300, preferably 3 to 200, more preferably 10 to 200, and still more preferably 15 to 100, and the organohydrogenpolysiloxane used is preferably the one which is liquid at room temperature (25° C.).

The hydrogen atom bonded to the silicon atom may be located either at the terminal of the molecular chain, in the midst of the molecular chain (not at the terminal of the molecular chain), or at both of such locations.

Examples of the organohydrogenpolysiloxane of the component (C) include 1,1,3,3-tetramethyldisiloxane, 1,3,5,7-tetramethylcyclotetrasiloxane, methylhydrogencyclopolysiloxane,
a cyclic copolymer of methylhydrogencyclosiloxane-dimethylsiloxane,
tris(dimethylhydrogensiloxy)methylsilane,
methylhydrogenpolysiloxane endcapped with trimethylsiloxy group at opposite ends,
a copolymer of dimethylsiloxane and methylhydrogensiloxane endcapped with trimethylsiloxy group at opposite ends,
dimethylpolysiloxane endcapped at opposite ends with dimethylhydrogensiloxy group,
a copolymer of dimethylsiloxane and methylhydrogensiloxane endcapped with dimethylhydrogensiloxy group at opposite ends,
a copolymer comprising $(CH_3)_2HSiO_{1/2}$ unit and $SiO_{4/2}$ unit,
a copolymer comprising $(CH_3)_3SiO_{1/2}$ unit, $(CH_3)_2HSiO_{1/2}$ unit and $SiO_{4/2}$ unit,
a copolymer comprising $(CH_3)_2HSiO_{1/2}$ unit, $SiO_{4/2}$ unit and $(CH_3)SiO_{3/2}$ unit, and
a copolymer comprising $(CH_3)_2HSiO_{1/2}$ unit, $SiO_{4/2}$ unit and $(CH_3)_2SiO_{2/2}$ unit.

The content of the hydrogen atom bonded to the silicon atom (SiH group) of the organohydrogenpolysiloxane of the component (C) is preferably 0.003 to 0.017 mol/g, and more preferably 0.005 to 0.017 mol/g. Crosslinking may not be sufficiently completed when the content is less than 0.003 mol/g while the content in excess of 0.017 mol/g may result in the production of an instable substance.

The organohydrogenpolysiloxane of the component (C) functions as a crosslinking agent as in the case of the component (B). While the incorporation of the organohydrogenpolysiloxane is optional, the incorporation of the component (C) is preferable when the curability and physical properties as a rubber are important. The organohydrogenpolysiloxane of the component (C) is preferably incorporated at 0 to 30 parts by weight, preferably 0.1 to 30 parts by weight, and most preferably 0.3 to 15 parts by weight in relation to 100 parts by weight of the component (A). Crosslinking will be insufficient and the resulting rubber will be sticky when the content is less than 0.1 part by weight, while the incorporation in excess of 30 parts by weight results in the poor physical properties as a rubber and the incorporation of such content is uneconomical.

In the present invention, the components are preferably used so that the molar ratio of the total amount of the SiH functional group in the component (B) and the component (C) to the amount of the alkenyl group in the component (A) (namely, SiH/alkenyl) is in the range of 0.8 to 5.0, preferably 1.2 to 4.0, and more preferably 1.5 to 3.0. Adhesion will be insufficient at the molar ratio of less than 0.8, and the molar ratio in excess of 5.0 may invite loss of physical properties as a rubber.

Examples of the triazole compound of the component (D) include 1,2,3-triazole, 1,2,4-triazole, benzotriazole, and derivatives thereof. More specifically, the derivatives of the 1,2,3-triazole include 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamide-4-methyl-1,2,3-triazole, 1-amino-4,5-diphenyl-1,2,3-triazole, 1,2,3-triazole-4-aldehyde, 4-cyano-1,2,3-triazole, and the like, and the derivatives of the 1,2,4-triazole include 1-methyl-1,2,4-triazole, 1,3-diphenyl-1,2,4-triazole, 5-amino-3-methyl-1,2,4-triazole, 3-mercapto-1,2,4-triazole, 1-phenyl-1,2,4-triazol-5-one, and 1-phenylurazole. The derivatives of the benzotriazole include 1-methyl benzotriazole, 5,6-dimethyl benzotriazole, 2-phenyl benzotriazole, 1-hydroxybenzotriazole, methyl 1-benzotriazole carboxylate. Of these, the preferred are benzotriazole, 1,2,3-triazole, 1-methyl-1,2,3-triazole, and 1,2,4-triazole, which may be used alone or in combination of two or more.

The component (D) is incorporated at an amount of 0.001 to 0.1 part by weight, and preferably 0.002 to 0.08 part by weight in relation to 100 parts by weight of the component (A). Sufficient pot life is not realized at a content of less than 0.001 part by weight while the incorporation in excess of 0.1 part by weight may result in the loss or curability.

With regard to the platinum catalyst of the component (E), examples include platinum black, platinic chloride, reaction products of the chloroplatinic acid and a monovalent alcohol, complexes of the chloroplatinic acid and an olefin, and platinum group compounds such as platinum bisacetoacetate.

This addition reaction catalyst is incorporated at a catalytic amount, and typically, at 0.1 to 1,000 ppm, and most preferably at 1 to 200 ppm in terms of the weight of platinum in relation to 100 parts by weight of the organopolysiloxane of the component (A).

Next, the reinforcement silica fine powder of the component (F) is not particularly limited for the type of silica, and any silica commonly used for the reinforcement of the rubber may be used. The reinforcement silica fine powder used may be the one which has been used in the conventional silicone rubber composition, and the preferred is the reinforcement silica fine powder having a specific surface area measured by BET method of at least 50 $m^2/g$. More specifically, the preferred are precipitated silica (wet silica), fumed silica (dry silica), calcined silica, and the like having the specific surface area measured by the BET method of 50 to 400 $m^2/g$, and the preferred is the use of fumed silica in view of improving the rubber strength. The reinforcement silica fine powder may be a surface-treated silica fine powder, and in this case, the silica fine powder may be the one which has been directly treated by a preliminary treatment in powder form.

The method used for the treatment may be a common method known in the art, and the treatment may be conducted, for example, by placing the untreated silica fine powder and the chemical reagent used for the treatment in a tightly sealed mechanical kneader or fluidized bed at normal pressure, and the mixed treatment is conducted at room temperature or by heat treatment in the optional presence of an inert gas. If desired, the treatment may be promoted by using a catalyst. After kneading, the treated silica fine powder is obtained by drying. The amount of the chemical reagent incorporated is an amount not less than the amount calculated from the area to be covered by the chemical reagent.

Exemplary chemical reagents include silazanes such as hexamethyldisilazane, silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane, and chloropropyltrimethoxysilane, and organosilicon compounds such as polymethylsiloxane, and organohydrogenpolysiloxane. The silica is surface treated by these reagents and the resulting silica is used as a hydrophobic silica fine powder. The chemical reagent used is most preferably a silane coupling agent or a silazane.

The component (F) is incorporated at an amount of 0 to 100 parts by weight, preferably 5 to 100 parts by weight, more preferably 5 to 80 parts by weight, still more preferably 10 to 50 parts by weight in relation to 100 parts by weight of the component (A). While the addition of the component (F) is not critical, the cured rubber prepared without using the component (F) may suffer from poor mechanical strength, and hence, from the problems in the molding, for example, in releasing from the mold. Incorporation in excess of 100 parts by weight results in the difficulty in the filling, and hence, in the poor workability process ability.

If desired, an acetylene alcohol compound or an acetylene alcohol compound modified with a silane or siloxane may be incorporated as the component (G) in the composition of the present invention as an optional component. This component (G) functions as a reaction inhibiting agent for the platinum catalyst, and the timing of the curing initiation can be controlled by the amount added.

The acetylene alcohol compound of the component (G) is not particularly limited as long as it has ethynyl group and hydroxy group in the same molecule. Preferably, the ethynyl group and the hydroxy group are bonded to the carbon atom. Examples include the following compounds.

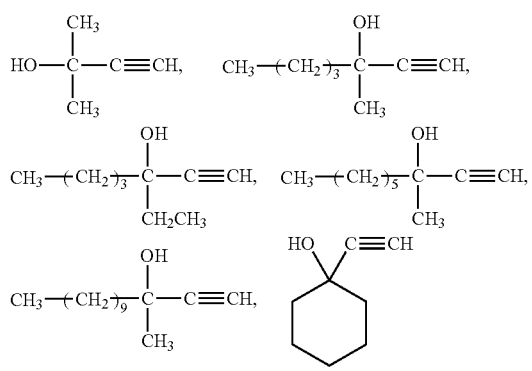

The acetylene alcohol compound modified with a silane or a siloxane is the one wherein the hydroxy group of the acetylene has bonded to the silane or the siloxane by the conversion of the hydroxy group of the acetylene to Si—O—C bond. Examples include the following compounds:

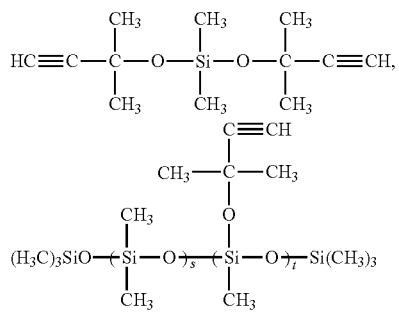

wherein s is an integer of 0 to 50, and preferably 3 to 20, and t is an integer of 1 to 50, and preferably 3 to 20.

The component (G) is incorporated at 0 to 1 part by weight, preferably 0.001 to 1 parts by weight, and more preferably 0.005 to 0.8 part by weight in relation to 100 parts by weight of the component (A). The effect of the reaction inhibiting agent is not fully realized at the content of less than 0.001 parts by weight whereas incorporation in excess of 1 parts by weight may result in retarded curing, and hence, in the poor physical properties as a rubber.

In addition to the components as described above, the addition curable self-adhesive silicone rubber composition of the present invention may contain various additives depending on the intended use of the rubber composition. Exemplary additives include inorganic fillers such as metal oxides (such as titanium oxide, iron oxide, cerium oxide, vanadium oxide, cobalt oxide, chromium oxide, manganese oxide, and composites thereof), quartz powder, diatomaceous earth, calcium carbonate, magnesium carbonate, alumina, carbon, hollow glass, hollow resin, electroconductive inorganic powders (such as gold, silver, and copper), and plated powder. The addition curable self-adhesive silicone rubber composition of the present invention may also contain pigment, heat resistant agent, flame retardant, plasticizer, and the like added to the extent not adversely affecting the intended properties. These optional components may be added at an amount commonly used in the art and to the extent not adversely affecting the merits of the invention.

The addition curable self-adhesive silicone rubber composition of the present invention can be produced by merely mixing the components (A) to (G) and optional components at room temperature to homogeneity. However, the component (F) is preferably mixed with all or a part of the component (A) and the mixture is heat treated in a planetary mixer or a kneader at a temperature in the range of 100 to 200° C. for 1 to 4 hours and cooled to room temperature before adding other components and kneading.

The method used for the molding may be freely selected depending on the viscosity of the mixture, and any of the encapsulation molding, press molding, dispenser molding, injection molding, extrusion molding, transfer molding, and the like may be employed. The curing may be typically accomplished at a temperature in the range of 60 to 200° C. for 10 seconds to 1 hour.

In order to efficiently realize the adhesion of the composition of the present invention, the preferred are the use of a method (insert molding) wherein an insert is preliminarily set in the mold, and uncured composition of the present invention is brought in contact with the insert and cured to thereby obtain an integrated article; or double molding wherein molten or uncured organic resin and the composition of the present invention are alternately injected into the mold to obtain an integrated article.

For the efficient molding, the composition may preferably have a viscosity at 25° C. in the range of 50 to 5,000 Pa·s, more preferably 80 to 4,000 Pa·s, and most preferably 100 to 3,000 Pa·s at a shear speed of $0.9\ s^{-1}$. The molding will be difficult when this viscosity is less than 50 Pa·s or in excess of 5,000 Pa·s. In the present invention, the viscosity may be measured by a rotary viscometer (for example, BL, BH, BS, or cone/plate type viscometer).

In the composition of the present invention, shear viscosity $\eta_0$ at 25° C. and at a shear rate of $0.9\ s^{-1}$ after homogeneously mixing the components (A) to (G) and the optional components as described above and storing at 25° C. for 10 minutes and shear viscosity $\eta_{12}$ at 25° C. and at a shear rate of $0.9\ s^{-1}$ after mixing and storing at 25° C. for 12 hours are preferably such that $\eta_{12}/\eta_0 \leq 2$, more preferably $1 \leq \eta_{12}/\eta_0 \leq 2$, and still more preferably $1 \leq \eta_{12}/\eta_0 \leq 1.8$. When the $\eta_{12}/\eta_0$ is in excess of 2, pot life after the homogeneous mixing will be shortened and workability will be lost.

The curing speed of the addition curable self-adhesive silicone rubber composition is measured as 10% curing time (T10 (sec)) at 110° C. (namely, the time from the start of the measurement when the torque value is 10% in relation to the maximum torque value measured at 110° C. during 3 minutes from the start of the measurement) by using a curability tester (Rotorless type disk rheometer, moving die rheometer, or MDR) at 110° C. for 3 minutes. The T10 (sec) is preferably in the range of 10 seconds≤T10≤60 seconds, and more preferably 15 seconds≤T10≤50 seconds in view of the efficiency. Curing may proceed too fast and molding may be difficult at the T10 of less than 10 seconds while T10 in excess of 60 seconds may be economically disadvantageous due to the unduly long cycle.

The addition curable self-adhesive silicone rubber composition of the present invention can be used in any field where an organic resin and silicone rubber are used as an integral component. Exemplary such fields include mobile phone, mobile telecommunications equipment, gaming machine, clocks, image receiver, DVD equipment, MD equipment, CD equipment, and other precision electronic equipment, microwave oven, refrigerator, electric rice cooker, cathode ray TV, thin displays of liquid crystal TV and plasma TV, various home appliance, copying machine, printer, facsimile machine, and other OA equipment, connector seal, spark plug cap, components of various sensors, and other automobile components.

The addition curable self-adhesive silicone rubber composition of the present invention exhibits good adhesion with organic resins. Exemplary organic resins which can be adhered by the composition of the present invention include normal thermoplastic resins prepared by olefin polymerization or polycondensation such as acrylonitrile-butadiene-styrene (ABS) resin, polycarbonate (PC) resin, polyurethane (PU) resin, styrene resin, polyethylene (PE) resin, polypropylene (PP) resin, acrylic resin, polyethylene terephthalate (PET) resin, polybuthylene terephthalate (PBT) resin, polyphenylene oxide (PPO) resin, polyphenylene sulfide (PPS) resin, polysulfone resin, nylon (PA) resin, aromatic polyamide (aromatic PA) resin, polyimide (PI) resin, and liquid crystal resin.

The addition curable self-adhesive silicone rubber composition of the present invention is preferably cured under the conditions enabling development of strong adhesion with the thermoplastic resin and the like, and more specifically, by using a temperature and curing time at which the resin is not deformed, melted, or denatured. While the conditions may differ by the type of the resin, thickness of the rubber, and the like, an integrally molded article can be obtained by molding at 120 to 220° C. for 5 seconds to about 5 minutes in the case of the resin having a high softening point, and molding at 60 to 120° C. for 15 seconds to 30 minutes in the case of the resin having a low softening point.

EXAMPLES

Next, the present invention is described in further detail by referring to Examples and Comparative Examples which by no means limit scope of the invention. The term "part" used in the Examples and Comparative Examples is part by weight.

Example 1

40 parts of fumed silica having hydrophobicized surface having a BET surface area of 200 m²/g (Reolosil HM30S manufactured by Tokuyama Corporation) and 1.3 parts of water were added to 60 parts of dimethylpolysiloxane A1 having opposite ends of the molecular chain endcapped with dimethylvinylsiloxy group (degree of polymerization 490) and having a viscosity at 25° C. of 10,000 mPa·s, and the mixture was homogeneously mixed in a kneader mixer. The mixture was further kneaded for 3 hours by heating to 150° C. to produce a silicone rubber base.

To this silicone rubber base, 70 parts of dimethylpolysiloxane A2 having opposite ends of the molecular chain endcapped with dimethylvinylsiloxy group (having a degree of polymerization of 1,000) and having a viscosity at 25° C. of 100,000 mPa·s, 3.0 parts of dimethylpolysiloxane A3 having opposite ends of the molecular chain endcapped with trimethylsiloxy group and having vinyl group on the side chain (dimethylsiloxane-vinylmethylsiloxane copolymer having opposite ends of the molecular chain endcapped with trimethylsiloxy group and having a polymerization degree of 150 and a vinyl value of 0.00088 mol/g), 1.2 parts of organohydrogenpolysiloxane C1 having opposite ends of the molecular chain endcapped with trimethylsiloxy group and having 10 SiH groups on average in the molecular chain, and wherein all of the monovalent hydrocarbon groups bonded to the silicon atom other the the oxygen atom and the hydrogen atom directly bonded to the silicon atom is methyl group (dimethylsiloxane-methylhydrogensiloxane copolymer having opposite ends of the molecular chain endcapped with trimethylsiloxy group having a polymerization degree of 28 and SiH group content of 0.0062 mol/g), 1.0 part of an adhesive aid B1 having the phenylene skeleton represented by the following formula (1):

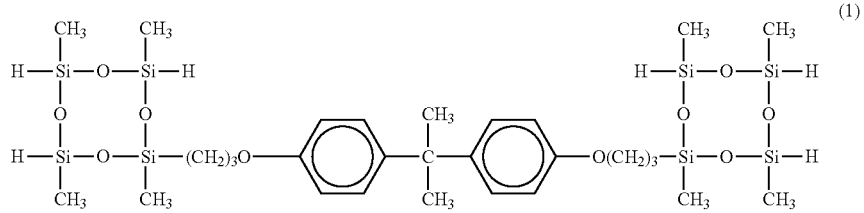

(SiH content, 0.0079 mol/g), and 0.2 part of 2-ethylhexanol solution of chloroplatinic acid (platinum atom, 1% by weight) were added, and in addition, 0.13 part of 50% by weight ethanol solution of ethynylcyclohexanol and 0.006 part of 50% by weight ethanol solution of benzotriazole were also added as a reaction inhibiting agent. The mixture was homogeneously kneaded (for about 30 minutes) to obtain a silicone rubber composition. Molar ratio of all SiH functional groups to all alkenyl groups in the silicone rubber composition (SiH group/alkenyl group) was 2.0.

The viscosity $\eta_0$ at a sheer rate of 0.9 $s^{-1}$ after kneading the silicone rubber composition and allowing the composition to stand at 25° C. for 10 minutes and the viscosity $\eta_{12}$ at a sheer rate of 0.9 $s^{-1}$ after kneading the silicone rubber composition and allowing the composition to stand at 25° C. for 12 hours were measured by a precision rotary viscometer (RotoVisco RV1 manufactured by EKO Instrument). The results are shown in Table 1. The hardness at 110° C. was also measured by rheometer MDR2000 (manufactured by Alpha Technologies), and the results are also shown in Table 1.

The silicone rubber composition was cured by pressing at 110° C. for 10 minutes, and the resulting cured product was evaluated for its hardness, tensile strength, and elongation at break by according to JIS-K6249. The results are shown in Table 2. Another evaluation was conducted by placing a test piece of PC (polycarbonate) (about 25×50 mm) in a mold, placing the silicone rubber composition on top of the test piece, conducing the curing by pressing at 110° C. for 5 minutes (rubber thickness, 1 to 3 mm), peeling the silicone rubber composition from the thus integrated article, and evaluating the adhesion by the percentage of cohesive failure (percentage of rubber failure=percentage (%) of the area which did not undergo the interfacial peeling but underwent the rubber failure (cohesive failure) in the entire area of the adhesion interface). The results are also shown in Table 2.

Example 2

40 parts of fumed silica having a BET surface area of 300 m²/g, 8 parts by weight of hexamethyldisilazane, and 2 parts of water were added to 70 parts of dimethylpolysiloxane A4 having opposite ends of the molecular chain endcapped with dimethylvinylsiloxy group (degree of polymerization 710) having a viscosity at 25° C. of 30,000 mPa·s, and the mixture was homogeneously mixed in a kneader mixer. The mixture was further kneaded for 3 hours by heating to 170° C. to produce a silicone rubber base. To this silicone rubber base, 30 parts of dimethylpolysiloxane A5 having opposite ends of the molecular chain endcapped with dimethylvinylsiloxy group (having a degree of polymerization of 210) and having a viscosity at 25° C. of 100,000 mPa·s, 1.5 parts of organohydrogenpolysiloxane C2 wherein all of the monovalent hydrocarbon groups bonded to the silicon atom is methyl group (dimethylsiloxane-methylhydrogensiloxane copolymer having opposite ends of the molecular chain endcapped with dimethylhydrogensiloxy group having a polymerization degree of 62 and SiH group content of 0.0051 mol/g), 0.4 part of an adhesive aid B2 having the phenylene skeleton represented by the following formula (2):

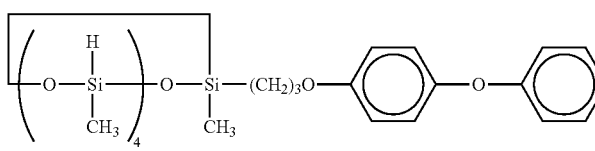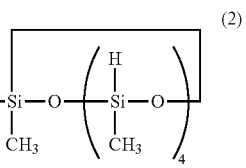

(2)

(SiH content, 0.0088 mol/g), and 0.25 part of toluene solution of a complex of platinum and 1,3-divinyl-1,1,3,3-tetramethyldisiloxane complex (platinum atom, 1% by weight) were added, and in addition, 0.12 part of 50% by weight toluene solution of ethynylcyclohexanol, as a reaction inhibiting agent and 0.008 part of 50% by weight ethanol solution of benzotriazole were also added as a reaction inhibiting agent. The mixture was homogeneously kneaded (for about 30 minutes) to obtain a silicone rubber composition. Molar ratio of all SiH functional groups to all alkenyl groups in the silicone rubber composition (SiH group/alkenyl group) was 1.8.

This silicone rubber composition was evaluated for the viscosity $\eta_0$, the viscosity $\eta_{12}$, and the curability by repeating the procedure of Example 1, and the results are shown in Table 1. The silicone rubber composition was also evaluated for the hardness, tensile strength, and elongation at break of the cures product as well as the adhesion by repeating the procedure of Example 1, and the results are shown in Table 2.

Example 3

40 parts of fumed silica having hydrophobicized surface having a BET surface area of 200 m²/g (Reolosil HM30S manufactured by Tokuyama Corporation) and 1.3 parts of water were added to 60 parts of dimethylpolysiloxane A1 of the Example 1, and the mixture was homogeneously mixed in a kneader mixer. The mixture was further kneaded for 3 hours by heating to 150° C. to produce a silicone rubber base. To this silicone rubber base, 70 parts of dimethylpolysiloxane A2 of the Example 1, 3.0 parts of dimethylpolysiloxane A3 of the Example 1, 1.2 parts of organohydrogenpolysiloxane C1 of Example 1 having opposite ends of the molecular chain endcapped with trimethylsiloxy group which has 10 SiH groups on average in the molecular chain, 1.0 part of an adhesive aid B1 of Example 1, and 0.2 part of 2-ethylhexanol solution of chloroplatinic acid (platinum atom, 1% by weight) were added, and in addition, 0.13 part of 50% by weight ethanol solution of ethynylcyclohexanol and 0.012 part of 50% by weight ethanol solution of 1,2,4-triazole were added as a reaction inhibiting agent. The mixture was homogeneously kneaded (for about 30 minutes) to obtain a silicone rubber composition. Molar ratio of all SiH functional groups to all alkenyl groups in the silicone rubber composition (SiH group/alkenyl group) was 2.0.

This silicone rubber composition was evaluated for the viscosity $\eta_0$, the viscosity $\eta_{12}$, and the curability by repeating the procedure of Example 1, and the results are shown in Table 1. The silicone rubber composition was also evaluated for the hardness, tensile strength, and elongation at break of the cured product as well as the adhesion by repeating the procedure of Example 1, and the results are shown in Table 2.

Comparative Example 1

40 parts of fumed silica having hydrophobicized surface having a BET surface area of 200 m²/g (Reolosil HM30S manufactured by Tokuyama Corporation) and 1.3 parts of water were added to 60 parts of dimethylpolysiloxane A1 of the Example 1, and the mixture was homogeneously mixed in a kneader mixer. The mixture was further kneaded for 3 hours by heating to 150° C. to produce a silicone rubber base. To this silicone rubber base, 70 parts of dimethylpolysiloxane A2 of Example 1, 3.0 parts of dimethylpolysiloxane A3 of Example 1, 1.2 parts of organohydrogenpolysiloxane C1 of Example 1 having opposite ends of the molecular chain endcapped with trimethylsiloxy group which has 10 SiH groups on average in the molecular chain, 1.0 part of an adhesive aid B1 of Example 1, and 0.2 part of 2-ethylhexanol solution of chloroplatinic acid (platinum atom, 1% by weight) were added, and in addition, 0.13 part of 50% by weight ethanol solution of ethynylcyclohexanol was added as a reaction inhibiting agent. The mixture was homogeneously kneaded (for about 30 minutes) to obtain a silicone rubber composition. Molar ratio of all SiH functional groups to all alkenyl groups in the silicone rubber composition (SiH group/alkenyl group) was 2.0.

This silicone rubber composition was evaluated for the viscosity $\eta_0$, the viscosity $\eta_{12}$, and the curability by repeating the procedure of Example 1, and the results are shown in Table 1. The silicone rubber composition was also evaluated for the hardness, tensile strength, and elongation at break of the cured product as well as the adhesion by repeating the procedure of Example 1, and the results are shown in Table 2.

Comparative Example 2

40 parts of fumed silica having hydrophobicized surface having a BET surface area of 200 m²/g (Reolosil HM30S manufactured by Tokuyama Corporation) and 1.3 parts of water were added to 60 parts of dimethylpolysiloxane A1 of Example 1, and the mixture was homogeneously mixed in a kneader mixer. The mixture was further kneaded for 3 hours by heating to 150° C. to produce a silicone rubber base. To this silicone rubber base, 70 parts of dimethylpolysiloxane A2 of Example 1, 3.0 parts of dimethylpolysiloxane A3 of Example 1, 1.2 parts of organohydrogenpolysiloxane C1 of Example 1 having opposite ends of the molecular chain endcapped with trimethylsiloxy group which has 10 SiH groups on average in the molecular chain, 1.0 part of an adhesive aid B1 of Example 1, and 0.2 part of 2-ethylhexanol solution of chloroplatinic acid (platinum atom, 1% by weight) were added, and in addition, 0.30 part of 50% by weight ethanol solution of ethynylcyclohexanol was added as a reaction inhibiting agent. The mixture was homogeneously kneaded (for about 30 minutes) to obtain a silicone rubber composition. Molar ratio of all SiH functional groups to all alkenyl groups in the silicone rubber composition (SiH group/alkenyl group) was 2.0.

This silicone rubber composition was evaluated for the viscosity $\eta_0$, the viscosity $\eta_{12}$, and the curability by repeating the procedure of Example 1, and the results are shown in Table 1. The silicone rubber composition was also evaluated for the hardness, tensile strength, and elongation at break of the cured product as well as the adhesion by repeating the procedure of Example 1, and the results are shown in Table 2.

TABLE 1

|  | Example | | | Comparative Example | |
|---|---|---|---|---|---|
|  | 1 | 2 | 3 | 1 | 2 |
| $\eta_0$ (Pa · s) | 560 | 680 | 550 | 580 | 570 |
| $\eta_{12}$ (Pa · s) | 820 | 1,220 | 930 | 2,400 | 900 |
| $\eta_{12}/\eta_0$ | 1.5 | 1.8 | 1.7 | 4.1 | 1.6 |
| Curability T10 (sec.) | 41 | 34 | 38 | 41 | 113 |

TABLE 2

|  | Example | | | Comparative Example | |
|---|---|---|---|---|---|
|  | 1 | 2 | 3 | 1 | 2 |
| Hardness (Durometer type A) | 37 | 36 | 37 | 37 | 35 |
| Tensile strength (MPa) | 7.5 | 8.5 | 7.2 | 7.5 | 6.8 |
| Elongation at break (%) | 650 | 700 | 590 | 660 | 710 |
| Adhesion | A | A | A | A | B |

A: cohesive failure: 90% or higher
B: cohesive failure: at least 80% and less than 90%

Japanese Patent Application No. 2012-278862 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition curable self-adhesive silicone rubber composition comprising
    (A) 100 parts by weight of an organopolysiloxane containing at least 2 alkenyl groups bonded to silicon atoms per molecule,
    (B) 0.05 to 10 parts by weight of an organosilicon compound containing 1 to 100 silicon atoms which has at least 1 phenylene skeleton per molecule, and which has at least 1 hydrogen atom bonded to a silicon atom per molecule, but free of an alicyclic epoxy radical,
    (C) 0 to 30 parts by weight of an organohydrogenpolysiloxane containing at least 2 hydrogen atoms bonded to silicon atoms per molecule, and containing no phenylene skeleton in the molecule,
    (D) 0.001 to 0.1 part by weight of a triazole compound,
    (E) a catalytic amount of a platinum catalyst, and
    (G) an acetylene alcohol compound or an acetylene alcohol compound having its alcoholic hydroxy group modified with a silane or a siloxane at an amount of 0.001 to 1 part by weight in relation to 100 parts by weight of the component (A).

2. The addition curable self-adhesive silicone rubber composition according to claim 1 further comprising
    (F) a reinforcement silica fine powder at an amount of 5 to 100 parts by weight in relation to 100 parts by weight of the component (A).

3. The addition curable self-adhesive silicone rubber composition according to claim 1 wherein content of the component (C) is 0.1 to 30 parts by weight in relation to 100 parts by weight of the component (A).

4. The addition curable self-adhesive silicone rubber composition according to claim 1 wherein a molar ratio of the total amount of the SiH functional group in the component (B) and the component (C) to the amount of the alkenyl group in the component (A) (SiH/alkenyl) is 0.8 to 5.0.

5. The addition curable self-adhesive silicone rubber composition according to claim 1 wherein the 10% curing time T10 (at 110° C. for 3 minutes) is 10 seconds≤T10≤60 seconds, and $\eta_{12}/\eta_0 \leq 2$ when shear viscosity 0.9 s$^{-1}$ at 25° C. after storing at 25° C. for 10 minutes after mixing the components (A) to (E) is $\eta_0$, and shear viscosity 0.9 s$^{-1}$ at 25° C. after storing at 25° C. for 12 hours after mixing the components (A) to (E) is $\eta_{12}$.

6. The addition curable self-adhesive silicone rubber composition according to claim 1 wherein the composition is the one for adhesion to a thermoplastic resin selected from acrylonitrile-butadiene-styrene (ABS) resin, polycarbonate (PC) resin, polyurethane (PU) resin, styrene resin, polyethylene (PE) resin, polypropylene (PP) resin, acrylic resin, polyethylene terephthalate (PET) resin, polybuthylene terephthalate (PBT) resin, polyphenylene oxide (PPO) resin, polyphenylene sulfide (PPS) resin, polysulfone resin, nylon (PA) resin, aromatic polyamide (aromatic PA) resin, polyimide (PI) resin, and liquid crystal resin.

\* \* \* \* \*